United States Patent [19]

Escaravage

[11] Patent Number: 4,840,405
[45] Date of Patent: Jun. 20, 1989

[54] MECHANISM FOR MAINTAINING A STRAP OF A SAFETY BELT IN AN ADJUSTABLE POSITION

[75] Inventor: Girard Escaravage, Valentigney, France

[73] Assignee: Eica-Equipements et Composants Pour L'Industrie Automobile, Audincourt, France

[21] Appl. No.: 198,349

[22] Filed: May 25, 1988

[30] Foreign Application Priority Data

May 27, 1987 [FR] France ................... 87 07506

[51] Int. Cl.$^4$ ............................................. B60R 22/20
[52] U.S. Cl. ..................... 280/808; 280/804; 297/483
[58] Field of Search ............... 280/804, 808, 801; 297/483

[56] References Cited

U.S. PATENT DOCUMENTS

| 4,560,204 | 12/1985 | Zeumer et al. | 280/808 |
| 4,624,479 | 11/1986 | Grunewald | 280/808 |
| 4,640,550 | 2/1987 | Hakansson | 280/808 |

FOREIGN PATENT DOCUMENTS 0133572 8/1984 European Pat. Off. .
3116909 11/1982 Fed. Rep. of Germany .

Primary Examiner—Richard A. Bertsch
Attorney, Agent, or Firm—Sughrue, Mion, Zinn, Macpeak and Seas

[57] ABSTRACT

The mechanism comprises, among other elements, a case (10), a lock (20) and a strap holder (30). The case has a periphery (11) and a front wall (12) provided with a slot (121) and a guide (122). The lock comprises a push-button (24), a keeper (21) articulated to the case at (212), a catch (22) movable in the slot and carrying the strap holder (30). Application in automobile vehicles.

12 Claims, 1 Drawing Sheet

MECHANISM FOR MAINTAINING A STRAP OF A SAFETY BELT IN AN ADJUSTABLE POSITION

BACKGROUND OF THE INVENTION

The present invention relates to safety belts for vehicles transporting passengers in particular over ground, and more particularly relates to an improved mechanism for maintaining a strap of a safety belt in an adjustable position, this mechanism being adapted to be fixed to a structure.

As is known, for safety reasons, vehicles transporting passengers are usually provided with seats equipped with safety belts. This is for example the case of aircraft and automobile vehicles.

As concerns automobile vehicles travelling on the ground, safety belts are usually employed which have two or three anchoring points. When a safety belt having three anchoring points is used, the strap comprises a waist part and a chest part which crosses the chest of the wearer in the manner of a shoulder-strap.

When a safety belt of the last-mentioned type is used, the chest part occupies a position relative to the wearer which is a function of the morphology of the latter, of the geometry of the vehicle and seat and moreover of the state of fatigue of the wearer. Under these conditions, the chest part may be positioned in some cases at the level of the neck of the wearer. It will be understood that, in the event of a violent collision, with the safety belt immobilized under the control of an inertia detector, the body of the passenger is violently thrown forwardly and his neck encounters the strap which may then no longer act as a safety means but as a particularly dangerous object. Indeed, in some collisions, serious injury to the neck has been found, which is produced by the safety belt and more particularly the chest part thereof.

This is the reason why it has already been proposed to arrange that the upper anchoring point of the chest part be in an adjustable position in order to take into account the morphology of the wearer relative to the configuration of the vehicle.

Various devices have already been proposed.

Very often they are so arranged that the upper anchoring point of the chest part can occupy multiple positions within a range of positions which takes into account the extreme morphologies of a population relative to the mean morphology.

These devices, which are sometimes motorized, are very complicated. They very often employ mechanisms of the screw-and-nut type which therefore permits progressively varying the position of the upper anchoring point of the chest part of the strap of the safety belt.

Other embodiments employ catches and apertures with respect to which are movable carriages of anchoring mechanisms.

It will therefore be understood that all these devices are complicated and consequently not very reliable and relatively expensive.

SUMMARY OF THE INVENTION

An object of the invention is to provide a mechanism for maintaining a safety belt strap in an adjustable position which avoids all these drawbacks, is relatively simple and cheap to manufacture and place in position.

The invention provides an improved mechanism for maintaining a strap of a safety belt in an adjustable potion which is adapted to be fixed to a structure and comprises, among other elements, a case, a lock and a strap holder.

In this mechanism, the case comprises a periphery with an anchoring base and a front wall provided with a a slot and a guide, the lock comprises a push-button accessible from the exterior and movably mounted in the guide, a movable keeper controller by the push-button and pivotally mounted on the case, a movable catch associated with the strap holder and engaged in the slot through which slot it extends for cooperation with the keeper, and a spring adapted to bias the keeper in a direction toward the push-button and the case.

Further features of the invention will be apparent from the following description and claims with reference to the accompanying drawing given solely by way of example and in which :

DETAILED DESCRIPTION OF A PREFERRED EMBODIMENT

Figure 1:
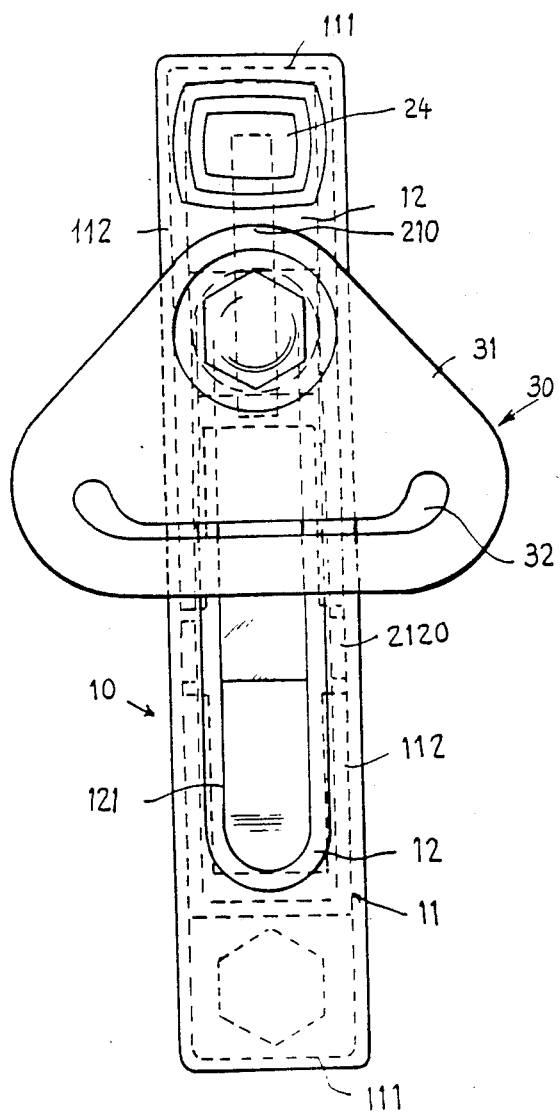
FIG. 1 is a diagrammatic front elevational view of a embodiment of a mechanism according to the invention.

Safety belts and the arrangements for the mounting thereof, in particular safety belts for automobile ground vehicles, are well knwon in the art, and the following description will therefore be limited to matter which directly or indirectly concerns the invention. For the rest of the mechanism, one skilled in the considered art will be able to refer to conventional solutions for solving particular problems which may be met with.

As can be seen in the Figures, the invention concerns a mechanism for holding a strap of a safety belt in an adjustable position and adapted to be fixed to a structure or body 50 of a vehicle. More particularly, the considered part of the structure is the central post or median upright part of the body which is usually located between the front and rear doors of a vehicle having four doors. For reasons which will be clear hereinafter, a cavity 51 and an aperture 52 have been provided in the structure for the mounting and the fixing of the mechanism according to the in vention.

The improved mechanism for holding a strap of a safety belt in an adjustable position according to the invention comprises mainly a case 10, a lock 2, and a strap holder 30.

As illustrated, the case 10 comprises a periphery 11 and a front wall 12.

The periphery 11 has end portions 111 with an anchoring base formed by a flange 1111 and an aperture 1112. These flanges constitute an anchoring base. This periphery also includes lateral side portions 112.

The front wall 12 is provided with a longitudinal slot 121 and carries a guide 122. A lock 20 is mounted in the case 10.

The lock 20 essentially comprises a keeper 21, a catch 22, a spring 23 and a push-member or a push-bottom 24.

The keeper 21 comprises a lever 210 provided in a median region with a transverse shoulder 211 and an articulation 212 on the case. For example, this articulation consists of lateral tabs 2120 which impart to the keeper an inverted T-shaped configuration when viewed as in FIG. 1. These two lateral tabs are engaged in notches 1120 provided the lateral side portions 112 of the case 10, as illustrated. Preferably, the shoulder 211 is produced by a bend or the like formed in the length of the lever 210.

The catch 22, for example, comprises a stud 220 having a flange 221 engaged in the slot 121 of the case 10 and in an orifice 33 provided in the strap holder, as shown in the drawing. The flange is preferably square-shaped.

The spring 23 is for example in the form of a strip 230 having a generally widened U shape provided substantially in its median region with elements for maintaining the keeper 231, such as bent wings 231.

The push-button 24 has a body part 240 terminating in a thrust portion 241. As can be seen, this push-button is directly or indirectly engaged in the guide 122 and its thrust portion 241 bears against the end of the lever 210 of the keeper 21 remote from that at which the articulation 212 with the case is located.

The strap holder 30 has a body 31 in which are provided a passage 32 for the strap and the orifice 33 which receives fixing means. As can be seen, these fixing means are, for example, a nut screwed onto the tapped end of the stud 220 of the catch 22. This tapped end defines a shoulder so that, when the nut is tightened, the catch is easily slidable in the slot 121 so that the strap holder is capable of turning about the stud 220 as can be seen in the Figures.

The reason for providing a certain degree of angular freedom to the strap holder will be apparent hereinafter.

The case 10, the lock 20 and the strap holder 30 of the mechanism according to the invention are mounted and assembled as shown in the drawing. In particular, it will be observed that, owing to the configuration and the manner in which the spring is positioned, the latter serves to maintain the keeper in position relative to the case and also normally biases it into an engaging position in which the flange 221 of the stud 220 of the catch 22 can be retained by the shoulder 211 formed by the bend in the lever 210 of the keeper 21. Furthermore, this spring applies the end of the keeper lever remote from the articulation 212 against the thrust portion 241 of the push-button 24 engaged in the the guide.

It will be assumed that, after assembly and mounting, the mechanism according to the invention occupies the position illustrated in the Figures. The strap holder therefore occupies the upper end of the slot provided in the front wall of the case. If it is desired to lower the position of the anchoring point of the strap, the push-button 24 is depressed, and this urges back the keeper 21 away from the front wall of the case. The shoulder 211 of the keeper then moves away from the flange 221 of the stud 220 of the catch 22 and releases this stud, so that the catch is free to slide in the slot 121 toward the lower end of the latter. When the push-button is released, the spring biases the keeper in the direction toward the front wall of the case.

Figure 2:
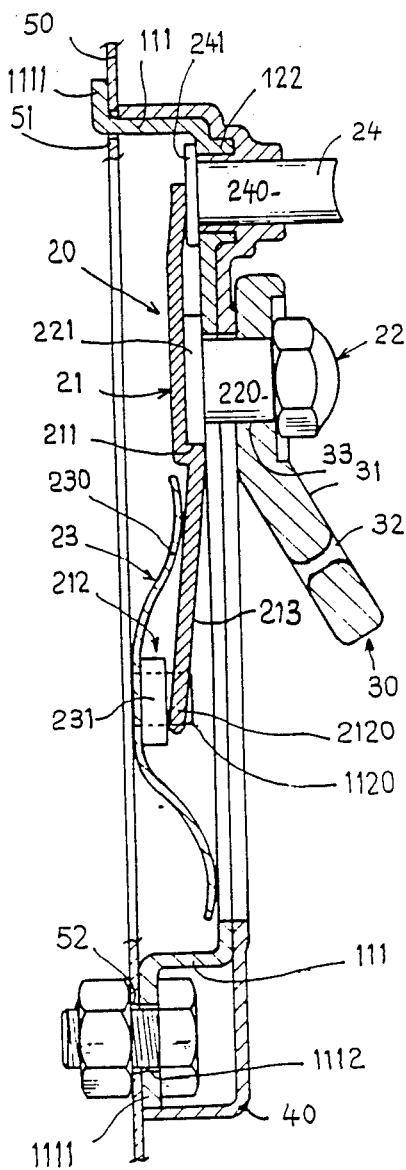
FIG. 2 is a longitudinal sectional view of the embodiment shown in FIG. 1.

Thus it can be seen that, with the mechanism according to the invention, the strap holder may be given two distinct positions, namely an upper position as illustrated, and a lower position when the keeper occupies the position at the bottom of the slot of the case. An examination of FIG. 2 shows that the lever 210 of the keeper 21 has an oblique ramp 213 which is upwardly inclined toward the front wall of the case. This ramp is located between the articulation 212 and the shoulder 211.

If the strap holder is located at the lower end of the slot and it is desired to place it in its upper position, it is sufficient to take hold of the strap holder and slide it in the slot of the case toward its upper position. The flange 231 of the stud 220 of the catch 22 then encounters, in the course of its displacement, the ramp 213 of the keeper which it urges back in opposition to the action of the spring until it escapes from the shoulder 211. As soon as this flange has passed beyond this shoulder, the keeper is biased in the direction toward the front wall of the case by the spring and the catch is then locked in the upper position.

In the illustrated embodiment, the mechanism according to the invention has only two possible positions of the holder 30. It will be understood that it is easy to provide intermediate positions. For this purpose it is sufficient for example to shift toward the bottom of the case the articulation of the keeper on the latter and to provide intermediate shoulders between the end of the keeper which cooperates with push-button and the end at which the articulation of the keeper on the case is located. The keeper is then in the form of a lever in which there is a series of steps separated by a series of ramps.

To assemble the mechanism according to the invention with the structure of a vehicle, it is sufficient to engage the flange 1111 in the cavity 51 and, after having placed the aperture 52 in alignment with the aperture 1112, to place therein fixing means such as a screw and a nut, as illustrated. When this assembly has been effected, an improved appearance can be given to the assembly by associating therewith a cover 40, for example of moulded plastics material. It is then sufficient to unscrew the nut which is screwed on the end of the stud 220 of the catch 22 to withdraw the strap holder 30 to allow the positioning of the cover 40. The strap holder is thereafter fixed in position by means of the nut which is once more screwed onto the stud 220.

All the advantages of this mechanism due to its simplicity of construction having a very small number of component parts are clear.

What is claimed is:

1. A mechanism for maintaining a strap of a safety belt in an adjustable position for fixing to a structure, and comprising a case, a lock and a strap holder; wherein said case comprises: a periphery with an anchoring base; and a front wall which is provided with a longitudinal slot having at least one closed end and with a guide located on the longitudinal axis of said slot in the vicinity of said closed end thereof; and said lock comprises: a push-member having a first end, accessible from the exterior of said case, and a second end located inside the latter and mounted in said guide to be movable in a direction substantially perpendicular to said front wall; a keeper located in said case and articulated to the latter to be tiltable relative to said front wall between a first retaining position, where it is close to said front wall, and a second releasing position where it is away from said front wall and cooperating with said second end of said push-member; a catch slidingly engaged in said slot and having an outer end, associated with said strap holder, and an inner end located in said case for cooperation with said keeper; and a spring located in said case and acting on said keeper for biasing the latter in its first position in a direction toward said second end of said push-member and the front wall of the case; whereby, when said first end of said push member is pushed, said keeper is pivoted from its first position to its second position so that it is allowed to release said inner end of said catch.

2. A mechanism according to claim 1, wherein the anchoring base is adapted to bear against said structure.

3. A mechanism according to claim 1, wherein the periphery includes two end portions each provided with a flange at least one of which flanges is provided with an aperture.

4. A mechanism according to claim 3, wherein the anchoring base comprises the flanges, one of which flanges is for engaging in a cavity in said structure while the other flange is provided with an aperture adapted to be put into alignment with an aperture in said structure.

5. A mechanism according to claim 1, wherein the spring is a spring strip having in the vicinity of a middle part, thereof means for maintaining the keeper in position.

6. A mechanism according to claim 5, wherein the means for maintaining the keeper in position are bent wings.

7. A mechanism according to claim 1, wherein the keeper is a lever provided in the length thereof with a shoulder cooperative with the catch.

8. A mechanism according to claim 7 wherein the shoulder of the keeper is adapted to retain the flange of the stud of the catch.

9. A mechanism according to claim 1, wherein the periphery of the case has two lateral side portions provided with notches and the keeper is provided with lateral tabs engaged in said notches so as to constitute an articulation.

10. A mechanism according to claim 9, wherein said lateral tabs are disposed at an end of the keeper which is remote from an end of the keeper which cooperates with the push-member.

11. A mechanism according to claim 10, wherein the maintaining means bear against the lateral tabs of the keeper.

12. A mechanism according to claim 1, wherein the catch is formed by a stud provided with a flange which cooperates with the keeper.

* * * * *